(12) United States Patent
Joseph et al.

(10) Patent No.: US 12,071,132 B2
(45) Date of Patent: Aug. 27, 2024

(54) VEHICULAR TRAILER HITCHING ASSIST SYSTEM

(71) Applicant: Magna Electronics Inc., Auburn Hills, MI (US)

(72) Inventors: Harold E. Joseph, Brampton (CA); Jagdish Rathod, Brampton (CA); Jyothi P. Gali, Rochester Hills, MI (US); Alexander Velichko, Toronto (CA)

(73) Assignee: Magna Electronics Inc., Auburn Hills, MI (US)

( * ) Notice: Subject to any disclaimer, the term of this patent is extended or adjusted under 35 U.S.C. 154(b) by 205 days.

(21) Appl. No.: 17/647,242

(22) Filed: Jan. 6, 2022

(65) Prior Publication Data

US 2022/0212668 A1   Jul. 7, 2022

Related U.S. Application Data (60) Provisional application No. 63/199,538, filed on Jan. 7, 2021.

(51) Int. Cl.
| | |
|---|---|
| *B60W 30/18* | (2012.01) |
| *B60Q 1/50* | (2006.01) |
| *G06T 7/73* | (2017.01) |
| *G06V 20/58* | (2022.01) |
| *H04N 5/232* | (2006.01) |
| *H04N 23/80* | (2023.01) |
| *B60R 11/00* | (2006.01) |
| *B60R 11/04* | (2006.01) |

(52) U.S. Cl.
CPC ......... *B60W 30/18036* (2013.01); *B60Q 1/50* (2013.01); *G06V 20/58* (2022.01); *H04N 23/80* (2023.01); *B60R 2011/004* (2013.01); *B60R 11/04* (2013.01); *B60W 2420/403* (2013.01); *B60W 2556/45* (2020.02)

(58) Field of Classification Search
None
See application file for complete search history.

(56) References Cited

U.S. PATENT DOCUMENTS

| | | | |
|---|---|---|---|
| 6,100,795 A * | 8/2000 | Otterbacher | B60D 1/36 340/471 |
| 6,690,268 B2 | 2/2004 | Schofield et al. | |
| 7,038,577 B2 | 5/2006 | Pawlicki et al. | |
| 7,720,580 B2 | 5/2010 | Higgins-Luthman | |
| 7,855,755 B2 | 12/2010 | Weller et al. | |
| 9,085,261 B2 | 7/2015 | Lu et al. | |

(Continued)

*Primary Examiner* — Jonathan M Dager
*Assistant Examiner* — Laura E Linhardt
(74) *Attorney, Agent, or Firm* — HONIGMAN LLP (57) ABSTRACT

A vehicular trailer hitching assist system includes a rearward-viewing camera disposed at a vehicle and viewing a hitch of the vehicle and a trailer coupler of a trailer that is positioned rearward of the vehicle and not coupled to the hitch of the vehicle. The vehicular trailer hitching assist system, via image processing of image data captured by the rearward-viewing camera, determines height of the trailer coupler relative to the hitch of the vehicle. The vehicular trailer hitching assist system, responsive to the determined height of the trailer coupler relative to the hitch of the vehicle being greater than a threshold amount, generates a signal to adjust the height of the trailer coupler.

19 Claims, 4 Drawing Sheets

(56) References Cited

U.S. PATENT DOCUMENTS

| | | |
|---|---|---|
| 9,446,713 B2 | 9/2016 | Lu et al. |
| 9,558,409 B2 | 1/2017 | Pliefke et al. |
| 9,609,757 B2 | 3/2017 | Steigerwald |
| 9,889,714 B2 * | 2/2018 | Bochenek ............... B60D 1/36 |
| 9,900,490 B2 | 2/2018 | Ihlenburg et al. |
| 10,071,687 B2 | 9/2018 | Ihlenburg et al. |
| 10,086,870 B2 | 10/2018 | Gieseke et al. |
| 10,089,537 B2 | 10/2018 | Nix et al. |
| 10,154,185 B2 | 12/2018 | Sigle et al. |
| 10,160,382 B2 | 12/2018 | Pliefke et al. |
| 10,264,219 B2 | 4/2019 | Mleczko et al. |
| 10,313,572 B2 | 6/2019 | Wohlte |
| 10,532,698 B2 | 1/2020 | Potnis et al. |
| 10,552,976 B2 | 2/2020 | Diessner et al. |
| 10,567,705 B2 | 2/2020 | Ziegenspeck et al. |
| 10,586,119 B2 | 3/2020 | Pliefke et al. |
| 10,638,025 B2 | 4/2020 | Gali et al. |
| 10,706,291 B2 | 7/2020 | Diessner et al. |
| 10,733,757 B2 | 8/2020 | Gupta et al. |
| 10,755,110 B2 | 8/2020 | Bajpai |
| 11,702,017 B2 | 7/2023 | Gali et al. |
| 2014/0081522 A1 * | 3/2014 | Fry ..................... B60G 17/017 701/37 |
| 2017/0217372 A1 | 8/2017 | Lu et al. |
| 2017/0254873 A1 | 9/2017 | Koravadi |
| 2018/0215313 A1 * | 8/2018 | Diessner ................ H04N 7/181 |
| 2018/0215382 A1 | 8/2018 | Gupta et al. |
| 2018/0251153 A1 * | 9/2018 | Li ........................ G05D 1/0225 |
| 2018/0276838 A1 | 9/2018 | Gupta et al. |
| 2018/0370527 A1 * | 12/2018 | Rachor ................. B60W 30/16 |
| 2019/0039649 A1 | 2/2019 | Gieseke et al. |
| 2019/0064831 A1 | 2/2019 | Gali et al. |
| 2019/0118860 A1 | 4/2019 | Gali et al. |
| 2020/0017143 A1 | 1/2020 | Gali |
| 2020/0334475 A1 | 10/2020 | Joseph et al. |
| 2020/0356788 A1 | 11/2020 | Joseph et al. |
| 2020/0361397 A1 | 11/2020 | Joseph et al. |
| 2020/0406967 A1 | 12/2020 | Yunus et al. |
| 2021/0078634 A1 | 3/2021 | Jalalmaab et al. |
| 2021/0127693 A1 | 5/2021 | Tomita et al. |
| 2021/0170820 A1 | 6/2021 | Zhang |
| 2021/0170947 A1 | 6/2021 | Yunus et al. |
| 2021/0291832 A1 * | 9/2021 | Simmons ............... B60W 10/20 |
| 2022/0027644 A1 | 1/2022 | Gali et al. |
| 2022/0028111 A1 | 1/2022 | Gali et al. |
| 2022/0189052 A1 | 6/2022 | Jalalmaab et al. |
| 2022/0212599 A1 | 7/2022 | Gali et al. |
| 2022/0215670 A1 | 7/2022 | Gali et al. |

* cited by examiner

VEHICULAR TRAILER HITCHING ASSIST SYSTEM

CROSS REFERENCE TO RELATED APPLICATION

The present application claims the filing benefits of U.S. provisional application Ser. No. 63/199,538, filed Jan. 7, 2021, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicular trailer assist systems is common and known. Examples of such known systems are described in U.S. Pat. Nos. 9,446,713 and 9,085,261, which are hereby incorporated herein by reference in their entireties.

SUMMARY OF THE INVENTION

A vehicular trailer hitching assist system includes a rearward-viewing camera disposed at a vehicle equipped with the vehicular trailer hitching assist system. The rearward-viewing camera views at least a hitch of the vehicle and a trailer coupler of a trailer that is positioned rearward of the vehicle. The rearward-viewing camera captures image data and the trailer coupler of the trailer is not coupled to the hitch of the vehicle. The rearward-viewing camera may include a CMOS imaging array having at least one million photosensors arranged in rows and columns. The system includes an electronic control unit (ECU) with electronic circuitry and associated software that includes an image processor operable to process image data captured by the rearward-viewing camera. The vehicular trailer hitching assist system, via image processing at the ECU of image data captured by the rearward-viewing camera, determines height of the trailer coupler relative to the hitch of the vehicle. The vehicular trailer hitching assist system, responsive to the determined height of the trailer coupler relative to the hitch of the vehicle being greater than a threshold amount, generates a signal to adjust the height of the trailer coupler.

These and other objects, advantages, purposes and features of the present invention will become apparent upon review of the following specification in conjunction with the drawings.

DESCRIPTION OF THE PREFERRED EMBODIMENTS

A vehicle and trailer maneuvering system or vehicular trailer hitching assist system and/or driving assist system operates to capture images exterior of the vehicle and trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The system includes an image processor or image processing system that is operable to receive image data from one or more cameras and may provide an output to a display device for displaying images representative of the captured image data. Optionally, the system may provide a rearview display or a top down or bird's eye or surround view display or the like.

Figure 1:
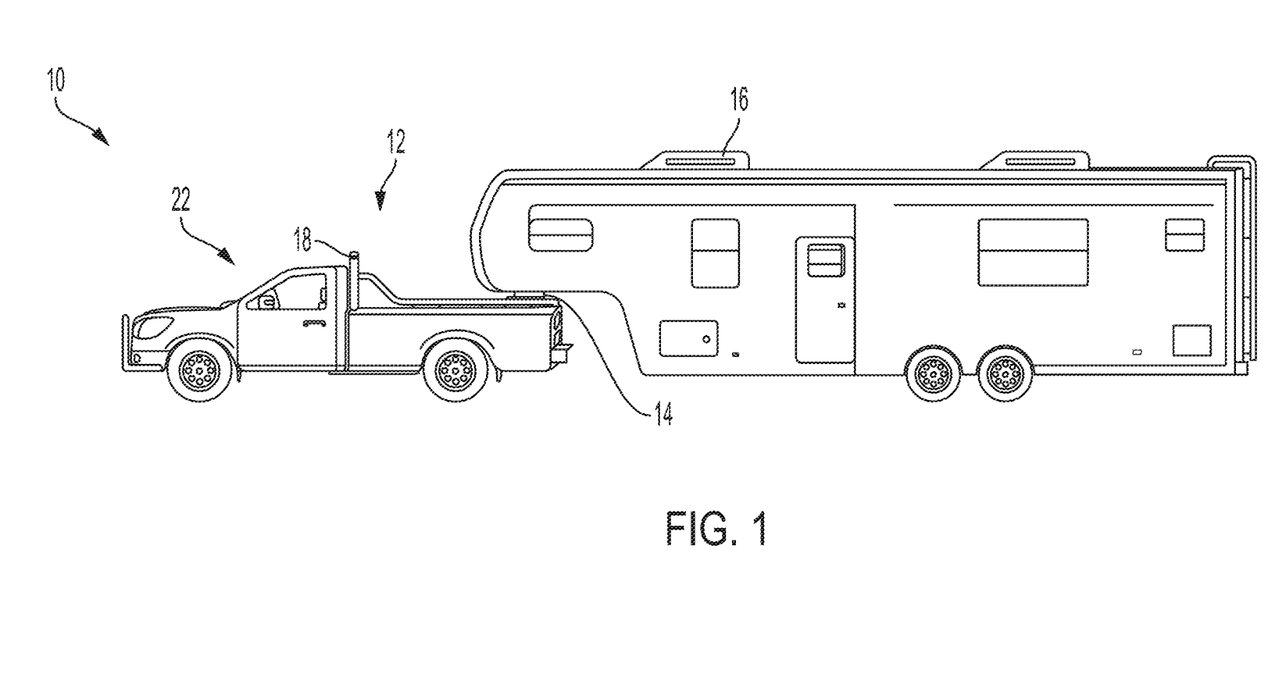
FIG. 1 is a side view of a vehicle with a vehicular trailer hitching assist system that is operable to determine respective positions of a hitch of the vehicle and a trailer coupler of a trailer and to determine a difference between a current height of the trailer coupler and a required height of the trailer coupler for hitching the trailer to the hitch of the vehicle.

Referring now to the drawings and the illustrative embodiments depicted therein, a vehicle 10 includes a vehicular trailer hitching assist system 12 that is operable to hitch, or assist an operator in hitching, a trailer 16 to the vehicle 10 via, for example, a hitch 14 at the vehicle, such as at or in a bed of a pickup truck. For example, the hitch couples the vehicle and trailer via a trailer coupler at the end of a trailer tongue hitching to a hitch ball of the hitch of the vehicle, or via a trailer coupler hitching to a hitching mechanism 14 located in a bed of the towing vehicle. In the illustrated embodiment, the trailer hitching assist system 12 includes at least one exterior viewing vehicle-based imaging sensor or camera, such as a rearward-viewing imaging sensor or camera 18 (and the system may optionally include multiple exterior viewing imaging sensors or cameras, such as a sideward/rearward-viewing camera at respective sides of the vehicle and/or a rear backup camera at a rear portion of the vehicle), which captures image data representative of the scene exterior of the vehicle 10 (FIG. 1). The field of view of the rearward-viewing camera 18 includes the hitch 14 and/or trailer 16. The rearward-viewing camera 18 includes a lens for focusing images at or onto an imaging array or imaging plane or imager of the camera. Optionally, the camera may be a center-high-mounted stop lamp (CHMSL) camera. Optionally, a forward-viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The trailer assist system 12 includes a control or electronic control unit (ECU) 22 or processor that is operable to process image data captured by the camera or cameras and may detect objects or the like and/or provide displayed images at a display device for viewing by the driver of the vehicle (the control 22 and/or display device may be part of or incorporated in or at an interior rearview mirror assembly of the vehicle, or the control and/or the display device may be disposed elsewhere at or in the vehicle). The lens may comprise a wide angle or fisheye lens and the camera may capture fisheye-view frames of image data for processing at the ECU. The data transfer or signal communication from the camera to the ECU may comprise any suitable data or communication link, such as a vehicle network bus or the like of the equipped vehicle. The image data may be communicated to the ECU via a coaxial cable, such as by utilizing aspects of the systems described in U.S. Pat. Nos. 10,567,705; 10,313,572; 10,264,219; 10,154,185; 10,089, 537; 10,071,687; 9,900,490 and/or 9,609,757, which are hereby incorporated herein by reference in their entireties.

Figure 2:
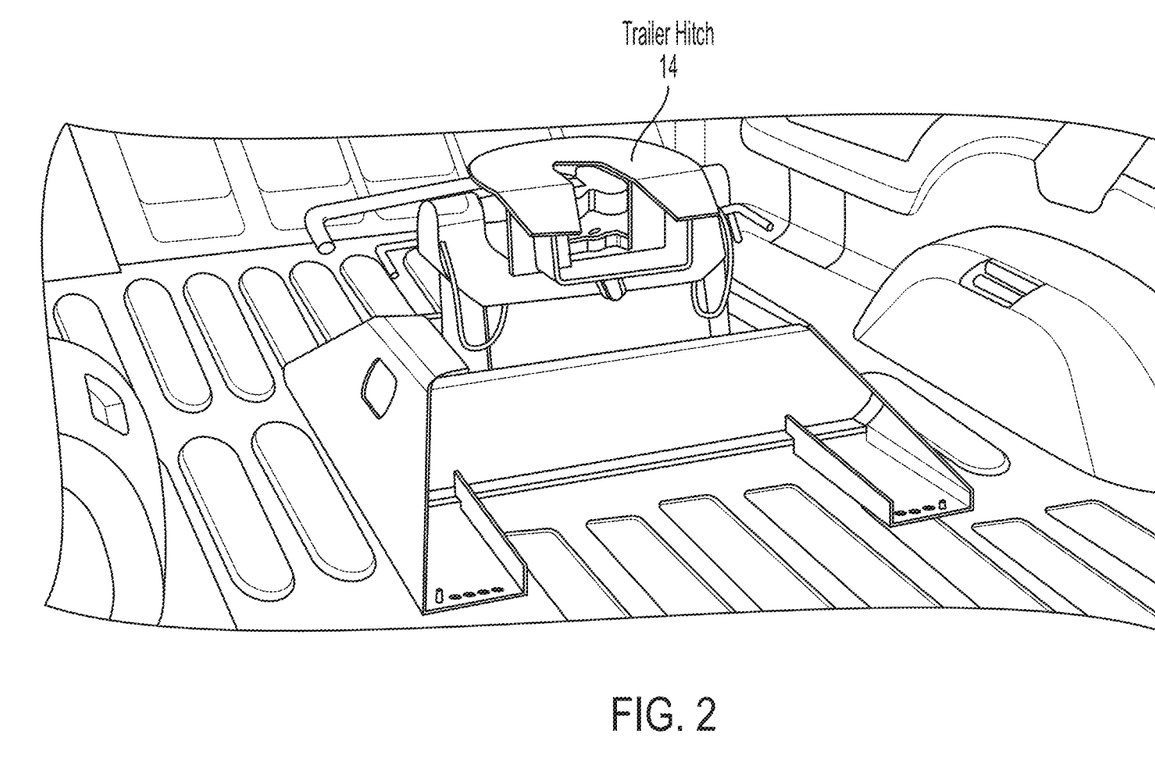
FIG. 2 is a perspective view of a bed-mounted hitch at a bed of a vehicle.

Connecting a nonconventional trailer (e.g., a trailer that hitches at the bed of the towing vehicle, such as a fifth-wheel trailer or a gooseneck trailer) is currently a tedious process. For example, the process involves adjusting the height of the coupler of the trailer accurately to a specified height prior to hitching the trailer to the vehicle. That is, the height of the coupler of the trailer must be raised or lowered based on the height of the hitch 14 mounted to the vehicle, so that the height of the trailer coupler matches the height of the trailer hitch at the vehicle (FIG. 2).

Figure 3:
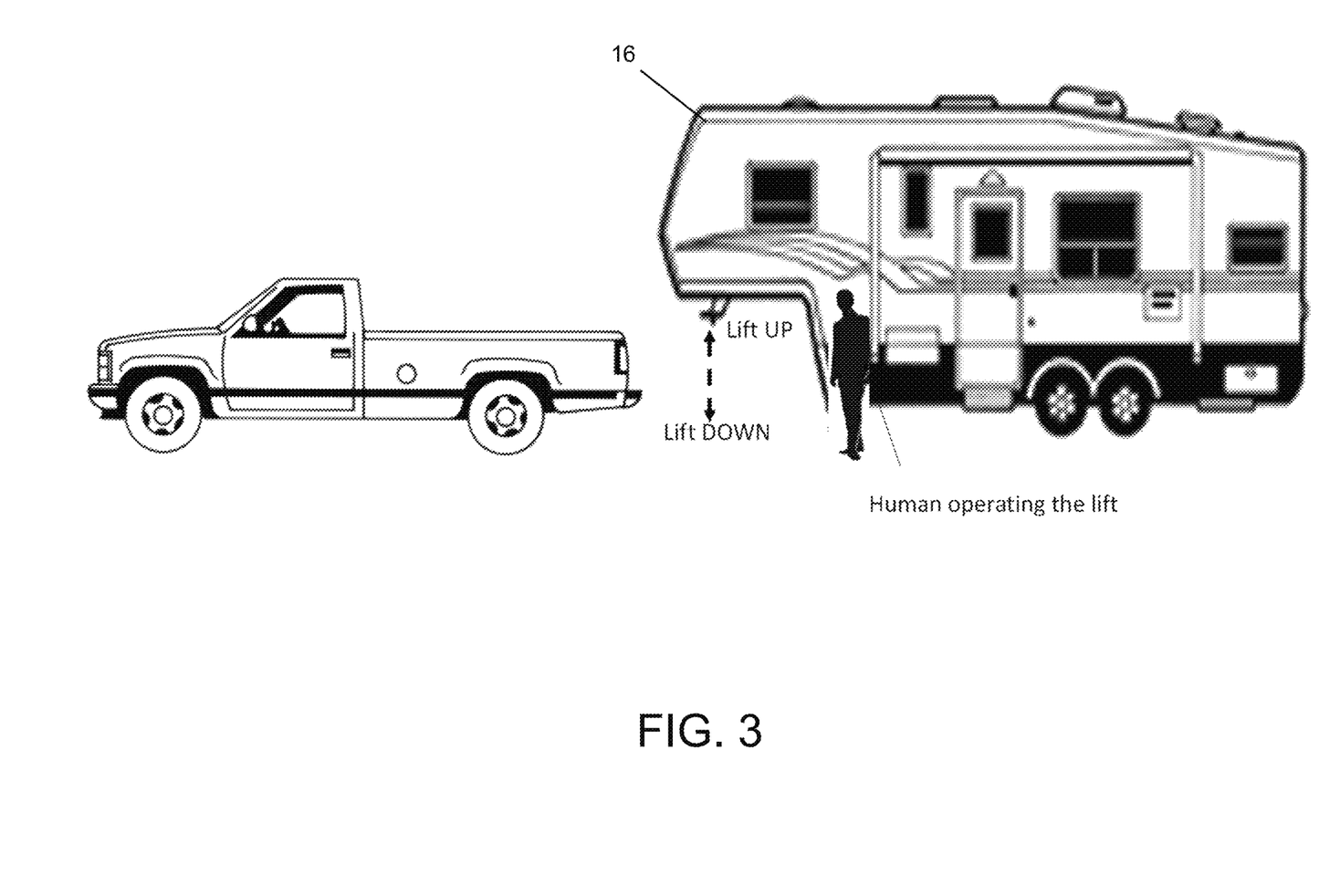
FIGS. 3 and 4 are schematic views of a human operator operating a lift of a fifth-wheel trailer.

Referring now to FIG. 3, this process may include positioning the towing vehicle (e.g., a pick-up truck) in front of the trailer 16, manually adjusting (i.e., raising or lowering) the height of the coupler of the trailer to the height necessary to couple the towing vehicle and the trailer. For example, the trailer may include a manual lift mechanism that the user may crank or otherwise control to adjust the height of the coupler of the trailer. The towing vehicle is then reversed to connect the trailer coupler to the hitch. Typically, the user estimates the required height of the trailer and when reversing the trailer, determines whether the estimate was correct or incorrect. When incorrect, the user may pull the vehicle forward and repeat the process.

As described further below, a contactless vision sensor system may process image data captured by one or more rearward-viewing cameras at the vehicle, such as one or more center-high-mounted stop lamp (CHMSL) cameras, for determining the required height of the trailer to couple the trailer to the hitch of the vehicle. The rearward-viewing CHMSL camera(s) 18 is/are mounted at an upper portion of the towing vehicle and overlook the trailer hitch (e.g., the bed of the truck). Thus, the CHMSL camera 18 has a field of view rearward of the vehicle and downward from the roof or upper portion of the cab of the vehicle. The system detects the hitch position and the coupler position of the trailer in image data captured by the CHMSL camera and estimates the current height of the trailer coupler and the required height of the trailer coupler for coupling to the hitch and provides indications or feedback to the user so that the user may adjust the height of the trailer coupler. In other words, the system may transmit signals to a system of the trailer for automatically adjusting the height of the trailer coupler to the required height. The system may also, when the height of the trailer coupler is at (or within a threshold height or distance of) the required height, maneuver the vehicle to align the trailer coupler and hitch for coupling.

The system is capable of accommodating different trailers and different couplers of various heights and shapes while catering to various illumination conditions (e.g., day, night, dawn, dusk, sunny, overcast, etc.). The system is able to work with all types of hitches (e.g., fixed and moving hitches). Optionally, the system is fully automatic (i.e., does not require user intervention or partially automatic (i.e., limited user intervention required) depending on the control unit of the trailer.

Figure 4:
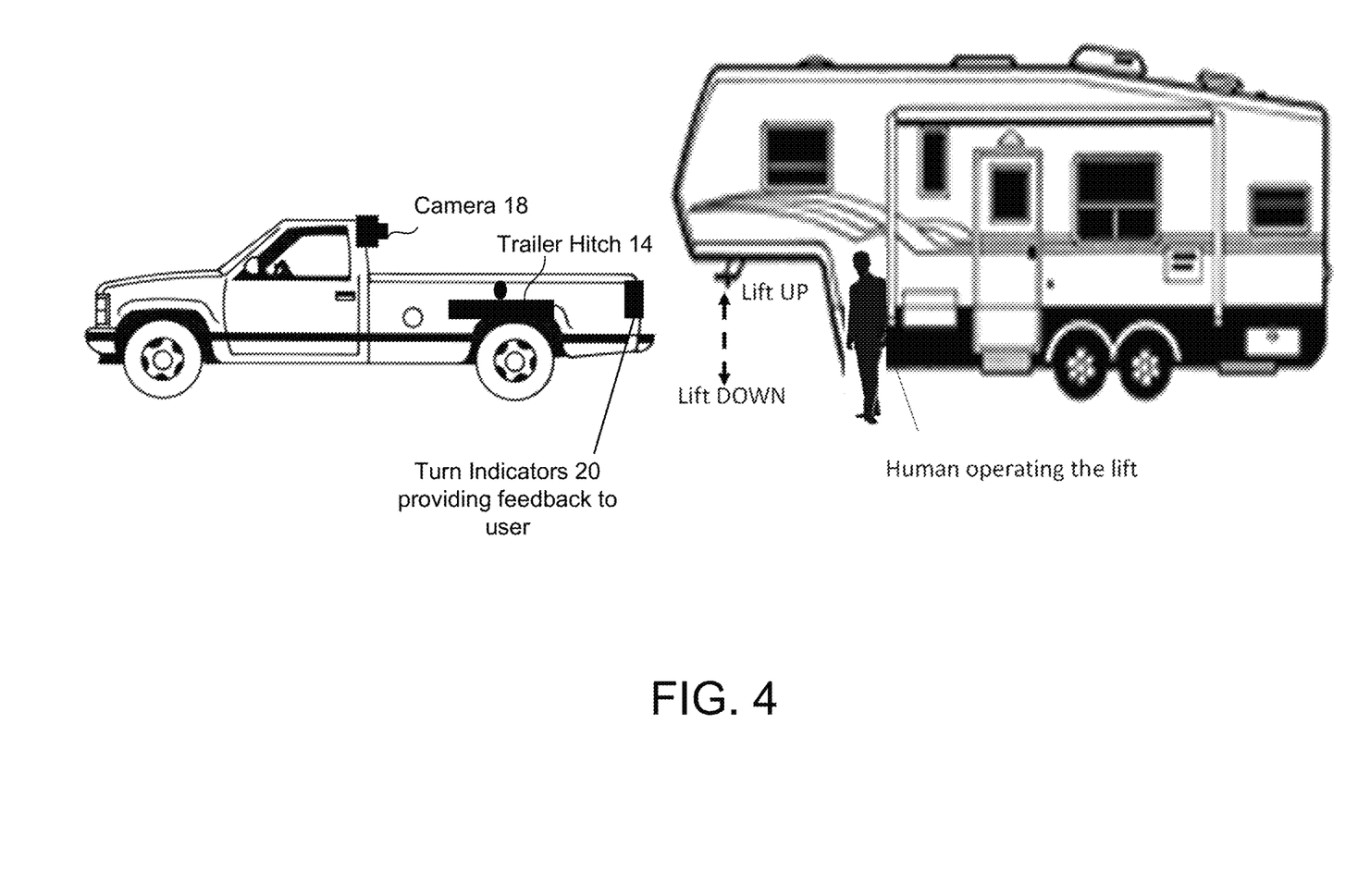

Referring now to FIG. 4, the system first requires the towing vehicle to be positioned in front of the trailer. For example, the system may require that the rear of the vehicle be facing the trailer so that the trailer coupler and/or trailer hitch may be at least partially in the field of view of the camera 18. The user may position the vehicle, or the system, using autonomous or semi-autonomous driving capabilities, may position the towing vehicle appropriately. When the vehicle is maneuvered into position, the system may provide a signal to the driver that the vehicle is at a suitable position, such as by providing an audible or visual alert or signal to the driver or via guidance lines overlaid onto rearview images (displayed at a video display screen in the vehicle and viewable by the driver of the vehicle) that indicate a desired position of the trailer relative to the vehicle. Optionally, the driver, after positioning the vehicle, enables a trailer coupler height guidance module.

The system is operable to determine whether a current height of the trailer coupler of the trailer should be adjusted to successfully align and couple the trailer coupler and the trailer hitch of the towing vehicle based on a comparison of a determined position of the trailer coupler and a determined position of the trailer hitch. The system may determine an absolute height of the trailer coupler (e.g., relative to a ground surface) and compare the absolute height of the trailer coupler to a height of the trailer hitch to determine whether the height of the trailer coupler should be adjusted, or the system may determine a relative height or position of the trailer coupler determined relative to the height or position of the trailer hitch to determine whether the height of the trailer coupler should be adjusted. The system may determine the height of the trailer hitch or the height of the trailer hitch may be a known value stored in memory or received from another system of the vehicle.

Optionally, for example, when determining the height of the trailer hitch, the system may determine the absolute height of the trailer hitch (e.g., relative to a ground surface) or the system may determine the relative height of the trailer hitch relative to the height of the trailer coupler. Based on the determined height of the trailer coupler and the height of the trailer hitch, the system determines a required height of the trailer coupler so that the trailer coupler can successfully couple to the trailer hitch (e.g., the hitch ball of the trailer hitch) and determines whether the height of the trailer coupler must be adjusted. Responsive to determining that the height of the trailer coupler should be adjusted, the system communicates a signal to adjust the height of the trailer coupler.

The system detects the position and determines the height or position of the trailer coupler and/or trailer hitch based on processing of image data captured by the rearward-viewing camera. For example, the image data may include both the trailer coupler and the trailer hitch and the system may process the image data to determine a relative height between the detected trailer coupler and the trailer hitch. Optionally, the image data may include only the trailer coupler and the height or position of the trailer hitch relative to the image data may be a known value.

Optionally, the system may determine an absolute height of the trailer coupler and/or trailer hitch. For example, the image data may include a portion of the ground surface (such as at or near the trailer) and the system may perform ground plane estimation to determine a height of the trailer coupler from the ground surface and/or a height of the trailer hitch from the ground surface. The system may determine the absolute height based on detecting one or more ground points or features via image processing of frames of image data captured by one or more rear viewing cameras of the vehicle (i.e., a rearward-viewing camera such as a CHMSL camera and/or rear backup camera, etc.). The system may receive vehicle information (e.g., from the user) to facilitate determining the height of the trailer hitch and/or trailer coupler (e.g., a height of the vehicle, size or type of the trailer, etc.) or retrieve the vehicle information from memory.

The system may process image data captured by any suitable camera of the vehicle to determine the height of the trailer coupler and/or trailer hitch. For example, the system may process image data captured by a rearward-viewing camera of the vehicle, the captured image data including the trailer coupler and/or trailer hitch. Optionally, the system may process image data from a plurality of cameras at the vehicle. For example, the rearward-viewing CHMSL camera may capture image data representative of the trailer hitch at the bed of the vehicle, and the CHMSL camera may not be currently able to view the trailer coupler. In such an example, the rear backup camera of the vehicle may view the trailer coupler and the system may process image data captured by the CHMSL camera that includes the trailer hitch and image data captured by the rear backup camera that includes the trailer coupler to determine the relative heights and/or positions of the trailer coupler and the trailer hitch.

As shown in FIG. 4, the system, based on image data captured by the rearward-viewing camera, detects the respective positions of the trailer coupler of the trailer and the trailer hitch of the towing vehicle. Responsive to determining the position of the trailer hitch of the towing vehicle, the system determines a required height of the trailer coupler to successfully hitch the towing vehicle and the trailer. Responsive to determining the position of the trailer coupler, the system determines a current height of the trailer coupler. Based on a difference between the determined required height of the trailer coupler and the determined current height of the trailer coupler, the system transmits a signal to adjust the height of the trailer coupler.

The system may compare the positions of the trailer coupler and the trailer hitch to determine the height of the trailer coupler relative to the trailer hitch and to determine whether that relative height is within a threshold amount or distance. If the determined height of the trailer coupler relative to the trailer hitch is greater than a threshold distance (either above or below the trailer hitch), the system generates a signal for adjusting the height of the trailer coupler. For example, the system may provide indications or feedback to the user to lower or increase the height of the trailer. Optionally, the system may use the turn indicators 20 of the vehicle to provide feedback to the user. For example, the system may enable the left indicator to indicate that the user should raise the trailer height and the system may enable the right indicator to indicate that the user should lower the trailer height (or vice versa). The system may continue to indicate to the user that the trailer should be raised or lowered until the current height of the trailer is at or near the required height (i.e., within a threshold amount of the required height).

The system may indicate when the trailer has reached the required height. For example, the system may stop blinking the turn indicators 20, the system may enable both turn indicators 20, or the system may provide some other visual or audible indication (e.g., honk the horn of the vehicle). When the required height of the trailer is achieved, the driver may reverse the vehicle until the coupler is aligned with the trailer hitch or couples with the trailer hitch. Alternatively, the system may, when the required height of the trailer is achieved, automatically reverse the vehicle until the coupler is aligned with the trailer hitch or couples with the trailer hitch.

In applications where the trailer is equipped with an automated height adjustment system, the vehicular trailer assist system may wirelessly communicate with the automated height adjustment system of the trailer, whereby the height adjustment system of the trailer automatically (i.e., without user intervention) adjusts the height of the trailer coupler to the determined required height.

Optionally, the system may determine the required height of the trailer coupler based on the position of the trailer coupler relative to the vehicle or trailer hitch of the vehicle. For example, the system may determine that the trailer coupler is at a position exterior the bed of the truck and the system may thus determine that the required height of the trailer coupler must accommodate a raised tailgate at the rear of the bed of the truck. In other words, the system may determine that the height of the trailer coupler must be great enough to allow the trailer coupler to clear the tailgate or side wall of the truck bed when the vehicle reverses. If the system determines that the trailer coupler is at a position within the bed of the truck (such as subsequent to the vehicle performing a first reverse maneuver to allow the trailer coupler to clear the tailgate), the system may thus determine the required height of the trailer coupler for the trailer coupler to couple to the hitch of the vehicle.

Thus, implementations herein provide a contactless vision sensor-based system for determining the required height of a nonconventional trailer (e.g., a fifth-wheel trailer or a gooseneck trailer) to successfully couple to a towing vehicle. The system provides feedback to a user to allow the user to quickly and accurately adjust the height of the trailer to the required height.

The system may utilize aspects of the trailering assist systems or trailer angle detection systems or trailer hitch assist systems described in U.S. Pat. Nos. 10,755,110; 10,733,757; 10,706,291; 10,638,025; 10,586,119; 10,552,976; 10,532,698; 10,160,382; 10,086,870; 9,558,409; 9,446,713; 9,085,261 and/or 6,690,268, and/or U.S. Publication Nos. US-2021-0170947; US-2021-0170820; US-2021-0078634; US-2020-0406967; US-2020-0361397; US-2020-0356788; US-2020-0334475; US-2020-0017143; US-2019-0118860; US-2019-0064831; US-2019-0039649; US-2018-0276838; US-2018-0215382; US-2017-0254873 and/or US-2017-0217372, and/or U.S. patent application Ser. No. 17/646,904, filed Jan. 4, 2022, U.S. patent application Ser. No. 17/646,902, filed Jan. 4, 2022, U.S. patent application Ser. No. 17/443,258, filed Jul. 23, 2021, Ser. No. 17/443,257, filed Jul. 23, 2021, Ser. No. 17/443,256, filed Jul. 23, 2021, and/or Ser. No. 17/643,596, filed Dec. 10, 2021, and/or International Publication No. WO 2021/0127693, which are all hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailer hitching assist system, the vehicular trailer hitching assist system comprising:
    a rearward-viewing camera mounted at a vehicle equipped with the vehicular trailer hitching assist system, the rearward-viewing camera at least viewing a hitch of the vehicle and a trailer coupler of a trailer that is positioned rearward of the vehicle, wherein the rearward-viewing camera captures image data, and wherein the trailer coupler of the trailer is not coupled to the hitch of the vehicle;
    wherein the vehicle comprises a pickup truck and the hitch of the vehicle is at a bed of the pickup truck;
    wherein the rearward-viewing camera comprises a CMOS imaging array having at least one million photosensors arranged in rows and columns;
    an electronic control unit (ECU) comprising electronic circuitry and associated software, wherein the electronic circuitry comprises an image processor operable to process image data captured by the rearward-viewing camera;
    wherein the vehicular trailer hitching assist system, via image processing at the ECU of image data captured by the rearward-viewing camera, determines (i) height of the trailer coupler relative to the hitch of the vehicle and (ii) position of the trailer coupler relative to the bed of the vehicle;
    wherein the vehicular trailer hitching assist system, responsive to the determined position of the trailer coupler relative to the bed of the vehicle being exterior the bed of the vehicle and responsive to the determined height of the trailer coupler relative to the hitch of the vehicle being greater than a first threshold amount, performs a first reversing maneuver to reverse the vehicle until the determined position of the trailer coupler relative to the bed of the vehicle is interior the bed of the vehicle as determined based on processing at the ECU of image data captured by the rearward-viewing camera;
    wherein the vehicular trailer hitching assist system, responsive to the determined position of the trailer coupler relative to the bed of the vehicle being interior the bed of the vehicle and responsive to the determined height of the trailer coupler relative to the hitch of the vehicle being greater than a second threshold amount, wirelessly transmits a first height adjustment command to a trailer height adjustment system of the trailer, and wherein the second threshold amount is less than the first threshold amount, and wherein, responsive to the first height adjustment command, the trailer height adjustment system of the trailer adjusts the height of the trailer coupler until the determined height of the trailer coupler relative to the hitch of the vehicle is less than the second threshold amount as determined based on processing at the ECU of image data captured by the rearward-viewing camera; and
    wherein the vehicular trailer hitching assist system, responsive to the determined position of the trailer coupler relative to the bed of the vehicle being interior the bed of the vehicle and responsive to the determined height of the trailer coupler relative to the hitch of the vehicle being less than the second threshold amount, performs a second reversing maneuver to reverse the vehicle to couple the trailer coupler with the hitch of the vehicle.

2. The vehicular trailer hitching assist system of claim 1, wherein the vehicular trailer hitching assist system determines the height of the trailer coupler relative to the hitch of the vehicle by comparing height of the trailer coupler to height of the hitch of the vehicle.

3. The vehicular trailer hitching assist system of claim 2, wherein the vehicular trailer hitching assist system determines the height of the hitch of the vehicle via image processing at the ECU of image data captured by the rearward-viewing camera.

4. The vehicular trailer hitching assist system of claim 2, wherein the height of the hitch of the vehicle is based on a known height of the hitch of the vehicle.

5. The vehicular trailer hitching assist system of claim 2, wherein the vehicular trailer hitching assist system determines the height of the trailer coupler relative to the hitch of the vehicle by determining height of the trailer coupler relative to a ground surface and comparing the determined height of the trailer coupler to the height of the hitch of the vehicle.

6. The vehicular trailer hitching assist system of claim 1, wherein the vehicular trailer hitching assist system, responsive to the determined height of the trailer coupler relative to the hitch of the vehicle being greater than the threshold amount, generates a signal, and wherein the generated signal is provided to a user to indicate to the user (i) that the trailer coupler is below the hitch of the vehicle by at least the threshold amount or (ii) that the trailer coupler is above the hitch of the vehicle by at least the threshold amount.

7. The vehicular trailer hitching assist system of claim 6, wherein the generated signal comprises actuating a turn signal indicator of the vehicle.

8. The vehicular trailer hitching assist system of claim 7, wherein the vehicular trailer hitching assist system actuates a first turn indicator of the vehicle to indicate to the user that the trailer coupler is below the hitch of the vehicle by at least the threshold amount, and wherein the vehicular trailer hitching assist system actuates a second turn indicator of the vehicle to indicate to the user that the trailer coupler is above the hitch of the vehicle by at least the threshold amount.

9. The vehicular trailer hitching assist system of claim 7, wherein the vehicular trailer hitching assist system generates a first signal responsive to the trailer coupler being below the hitch of the vehicle by at least the threshold amount, and wherein the vehicular trailer hitching assist system generates a second signal responsive to the trailer coupler being above the hitch of the vehicle by at least the threshold amount.

10. The vehicular trailer hitching assist system of claim 1, wherein the vehicular trailer hitching assist system, responsive to the determined height of the trailer coupler relative to the hitch of the vehicle being less than the threshold amount, automatically reverses the vehicle to couple the trailer coupler with the hitch of the vehicle.

11. The vehicular trailer hitching assist system of claim 1, wherein the rearward-viewing camera is disposed at a center high-mounted stop lamp (CHMSL) of the vehicle.

12. The vehicular trailer hitching assist system of claim 1, wherein the vehicular trailer hitching assist system, responsive to the determined position of the trailer coupler relative to the bed of the vehicle being exterior the bed of the vehicle and responsive to the determined height of the trailer coupler relative to the hitch of the vehicle being less than the first threshold amount, wirelessly transmits a second height adjustment command to the trailer height adjustment system of the trailer, and wherein, responsive to the second height adjustment command, the trailer height adjustment system of the trailer adjusts the height of the trailer coupler until the determined height of the trailer coupler relative to the hitch of the vehicle is greater than the first threshold amount as determined based on processing at the ECU of image data captured by the rearward-viewing camera.

13. The vehicular trailer hitching assist system of claim 1, wherein the trailer comprises one selected from the group consisting of (i) a fifth wheel trailer and (ii) a gooseneck trailer.

14. A vehicular trailer hitching assist system, the vehicular trailer hitching assist system comprising:
  a rearward-viewing camera mounted at a vehicle equipped with the vehicular trailer hitching assist system, the rearward-viewing camera at least viewing a hitch of the vehicle and a trailer coupler of a trailer that is positioned rearward of the vehicle, wherein the rearward-viewing camera captures image data, and wherein the trailer coupler of the trailer is not coupled to the hitch of the vehicle;
  wherein the vehicle comprises a pickup truck and the hitch of the vehicle is at a bed of the pickup truck;
  wherein the rearward-viewing camera comprises a CMOS imaging array having at least one million photosensors arranged in rows and columns;
  an electronic control unit (ECU) comprising electronic circuitry and associated software, wherein the electronic circuitry comprises an image processor operable to process image data captured by the rearward-viewing camera;
  wherein the vehicular trailer hitching assist system, via image processing at the ECU of image data captured by the rearward-viewing camera, determines (i) height of the trailer coupler relative to the hitch of the vehicle by comparing height of the trailer coupler to height of the hitch of the vehicle and (ii) position of the trailer coupler relative to the bed of the vehicle;
  wherein the vehicular trailer hitching assist system, responsive to the determined position of the trailer coupler relative to the bed of the vehicle being exterior the bed of the vehicle and responsive to the determined height of the trailer coupler relative to the hitch of the vehicle being greater than a first threshold amount, performs a first reversing maneuver to reverse the vehicle until the determined position of the trailer coupler relative to the bed of the vehicle is interior the bed of the vehicle as determined based on processing at the ECU of image data captured by the rearward-viewing camera;
  wherein the vehicular trailer hitching assist system, responsive to the determined position of the trailer coupler relative to the bed of the vehicle being interior the bed of the vehicle and responsive to the determined height of the trailer coupler relative to the hitch of the vehicle being greater than a second threshold amount, generates a signal, and wherein the second threshold amount is less than the first threshold amount, and wherein the generated signal is provided to a user to indicate to the user that the trailer coupler is above the hitch of the vehicle by at least the second threshold amount;
  wherein the vehicular trailer hitching assist system, responsive to the determined position of the trailer coupler relative to the bed of the vehicle being interior the bed of the vehicle and responsive to the determined height of the trailer coupler relative to the hitch of the vehicle being greater than the second threshold amount, wirelessly transmits a height adjustment command to a trailer height adjustment system of the trailer, and wherein, responsive to the height adjustment command, the trailer height adjustment system of the trailer adjusts the height of the trailer coupler until the determined height of the trailer coupler relative to the hitch of the vehicle is less than the second threshold amount as determined based on processing at the ECU of image data captured by the rearward-viewing camera; and
  wherein the vehicular trailer hitching assist system, responsive to the determined position of the trailer coupler relative to the bed of the vehicle being interior the bed of the vehicle and responsive to the determined height of the trailer coupler relative to the hitch of the vehicle being less than the second threshold amount, performs a second reversing maneuver to reverse the vehicle to couple the trailer coupler with the hitch of the vehicle.

15. The vehicular trailer hitching assist system of claim 14, wherein the vehicular trailer hitching assist system determines the height of the hitch of the vehicle via image processing at the ECU of image data captured by the rearward-viewing camera.

16. The vehicular trailer hitching assist system of claim 14, wherein the height of the hitch of the vehicle is based on a known height of the hitch of the vehicle.

17. The vehicular trailer hitching assist system of claim 14, wherein the vehicular trailer hitching assist system determines the height of the trailer coupler relative to the hitch of the vehicle by determining height of the trailer coupler relative to a ground surface and comparing the determined height of the trailer coupler to the height of the hitch of the vehicle.

18. A vehicular trailer hitching assist system, the vehicular trailer hitching assist system comprising:
  a rearward-viewing camera mounted at a vehicle equipped with the vehicular trailer hitching assist system, the rearward-viewing camera at least viewing a hitch of the vehicle and a trailer coupler of a trailer that is positioned rearward of the vehicle, wherein the rearward-viewing camera captures image data, and wherein the trailer coupler of the trailer is not coupled to the hitch of the vehicle;

wherein the vehicle comprises a pickup truck and the hitch of the vehicle is at a bed of the pickup truck;

wherein the rearward-viewing camera comprises a CMOS imaging array having at least one million photosensors arranged in rows and columns;

an electronic control unit (ECU) comprising electronic circuitry and associated software, wherein the electronic circuitry comprises an image processor operable to process image data captured by the rearward-viewing camera;

wherein the vehicular trailer hitching assist system, via image processing at the ECU of image data captured by the rearward-viewing camera, determines (i) height of the trailer coupler relative to the hitch of the vehicle and (ii) position of the trailer coupler relative to the bed of the vehicle;

wherein the vehicular trailer hitching assist system, responsive to the determined position of the trailer coupler relative to the bed of the vehicle being exterior the bed of the vehicle and responsive to the determined height of the trailer coupler relative to the hitch of the vehicle being greater than a first threshold amount, performs a first reversing maneuver to reverse the vehicle until the determined position of the trailer coupler relative to the bed of the vehicle is interior the bed of the vehicle as determined based on processing at the ECU of image data captured by the rearward-viewing camera;

wherein the vehicular trailer hitching assist system, responsive to the determined position of the trailer coupler relative to the bed of the vehicle being interior the bed of the vehicle and responsive to the determined height of the trailer coupler relative to the hitch of the vehicle being greater than a second threshold amount, generates a signal, and wherein the second threshold amount is less than the first threshold amount, and wherein the generated signal is provided to a user to indicate to the user that the trailer coupler is above the hitch of the vehicle by at least the second threshold amount;

wherein the vehicular trailer hitching assist system, responsive to the determined position of the trailer coupler relative to the bed of the vehicle being interior the bed of the vehicle and responsive to the determined height of the trailer coupler relative to the hitch of the vehicle being greater than the second threshold amount, wirelessly transmits a first height adjustment command to a trailer height adjustment system of the trailer, and wherein, responsive to the first height adjustment command, the trailer height adjustment system of the trailer adjusts the height of the trailer coupler until the determined height of the trailer coupler relative to the hitch of the vehicle is less than the second threshold amount as determined based on processing at the ECU of image data captured by the rearward-viewing camera;

wherein the vehicular trailer hitching assist system, responsive to the determined position of the trailer coupler relative to the bed of the vehicle being interior the bed of the vehicle and responsive to the determined height of the trailer coupler relative to the hitch of the vehicle being less than the second threshold amount, performs a second reversing maneuver to reverse the vehicle to couple the trailer coupler with the hitch of the vehicle; and wherein the vehicular trailer hitching assist system, responsive to the determined position of the trailer coupler relative to the bed of the vehicle being exterior the bed of the vehicle and responsive to the determined height of the trailer coupler relative to the hitch of the vehicle being less than the first threshold amount, wirelessly transmits a second height adjustment command to the trailer height adjustment system of the trailer, and wherein, responsive to the second height adjustment command, the trailer height adjustment system of the trailer adjusts the height of the trailer coupler until the determined height of the trailer coupler relative to the hitch of the vehicle is greater than the first threshold amount as determined based on processing at the ECU of image data captured by the rearward-viewing camera.

19. The vehicular trailer hitching assist system of claim 18, wherein the rearward-viewing camera is disposed at a center high-mounted stop lamp (CHMSL) of the vehicle.

* * * * *